(12) United States Patent
Xie et al.

(10) Patent No.: US 11,316,967 B2
(45) Date of Patent: Apr. 26, 2022

(54) SCREEN ON AND OFF STATE CONTROL METHOD AND MOBILE TERMINAL

(71) Applicant: VIVO MOBILE COMMUNICATION CO., LTD., Guangdong (CN)

(72) Inventors: Jinyao Xie, Guangdong (CN); Weirong Yan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/962,525

(22) PCT Filed: Jan. 10, 2019

(86) PCT No.: PCT/CN2019/071161
§ 371 (c)(1),
(2) Date: Jul. 16, 2020

(87) PCT Pub. No.: WO2019/149044
PCT Pub. Date: Aug. 8, 2019

(65) Prior Publication Data
US 2020/0382631 A1  Dec. 3, 2020

(30) Foreign Application Priority Data

Jan. 30, 2018 (CN) .......................... 201810090932.8

(51) Int. Cl.
*H04M 1/72454* (2021.01)
*H04N 5/33* (2006.01)

(52) U.S. Cl.
CPC .......... *H04M 1/72454* (2021.01); *H04N 5/33* (2013.01); *H04M 2250/12* (2013.01)

(58) Field of Classification Search
CPC ............................. H04M 1/72454; H04N 5/33
See application file for complete search history.

(56) References Cited

U.S. PATENT DOCUMENTS

| 2002/0126879 | A1* | 9/2002 | Mihara | G06K 9/00201 382/118 |
| 2012/0157044 | A1* | 6/2012 | Kim | H04W 12/086 455/410 |

(Continued)

FOREIGN PATENT DOCUMENTS

| CN | 102204232 A | 9/2011 |
| CN | 102523351 A | 6/2012 |

(Continued)

OTHER PUBLICATIONS

First Office Action dated Jul. 19, 2019 issued on Chinese Application No. 201810090932.8.

(Continued)

*Primary Examiner* — Fabricio R Murillo Garcia
(74) *Attorney, Agent, or Firm* — Gearhart Law LLC; David Postolski, Esq.

(57) ABSTRACT

The present disclosure provides a screen ON-and-OFF state control method and a mobile terminal. The screen ON-and-OFF state control method includes: during a distance detection through a far-channel IR detection, when a timing start condition for a near-channel IR detection has been met, interrupting the far-channel IR detection, and enabling the near-channel IR detection for the distance detection; and controlling ON and OFF states of a screen of the mobile terminal in accordance with a distance detection result of the near-channel IR detection. A transmission power of an IR light beam corresponding to the far-channel IR detection is greater than a transmission power of an IR light beam corresponding to the near-channel IR detection.

17 Claims, 4 Drawing Sheets

(56) References Cited

U.S. PATENT DOCUMENTS

| | | | |
|---|---|---|---|
| 2013/0260843 A1 | 10/2013 | Hu | |
| 2014/0337654 A1 | 11/2014 | Chen | |
| 2016/0055806 A1* | 2/2016 | Lozovoy | G06F 1/3212 |
| | | | 345/690 |
| 2018/0189468 A1* | 7/2018 | Shim | G06K 9/00006 |
| 2019/0361120 A1 | 11/2019 | Li et al. | |
| 2020/0137215 A1 | 4/2020 | Zhou | |

FOREIGN PATENT DOCUMENTS

| | | |
|---|---|---|
| CN | 103324276 A | 9/2013 |
| CN | 103885588 A | 6/2014 |
| CN | 103997608 A | 8/2014 |
| CN | 104123006 A | 10/2014 |
| CN | 105391852 A | 3/2016 |
| CN | 105915717 A | 8/2016 |
| CN | 106375606 A | 2/2017 |
| CN | 106650383 A | 5/2017 |
| CN | 106873879 A | 6/2017 |
| CN | 107422876 A | 12/2017 |
| CN | 107454270 A | 12/2017 |
| CN | 108322608 A | 7/2018 |
| GB | 2170907 A | 8/1986 |

OTHER PUBLICATIONS

International Preliminary Report on Patentability/Written Opinion dated Aug. 13, 2020 issued in PCT/CN2019/071161.
Extended European Search Report dated Mar. 1, 2021 issued in PCT/CN2019/071161.

* cited by examiner

US 11,316,967 B2

SCREEN ON AND OFF STATE CONTROL METHOD AND MOBILE TERMINAL

CROSS-REFERENCE TO RELATED APPLICATION

The present application is the U.S. national phase of PCT Application No. PCT/CN2019/071161 filed on Jan. 10, 2019, which claims a priority of the Chinese patent application 201810090932.8 filed on Jan. 30, 2018, which are incorporated herein by reference in their entirety.

TECHNICAL FIELD

The present disclosure relates to the field of a terminal, in particular to a screen ON-and-OFF state control method, and a mobile terminal.

BACKGROUND

Current, distance detection is performed by a mobile terminal through an infrared (IR) sensor, so as to determine whether there is an obstacle too close to a screen of the mobile terminal, e.g., determine whether a user's face is too close to the screen during a call. When the user's face is too close to the screen, the screen is controlled to be in an OFF state, so as to prevent the occurrence of a misoperation for the reason that the screen is touched by the user's face unnecessarily.

In actual use, usually a dual IR distance detection system is used by the mobile terminal to perform the distance detection. In the dual IR distance detection system, one emitter is used for both far-channel IR detection and near-channel IR detection. During the call, the distance detection is performed by the mobile terminal using the dual IR distance detection system. To be specific, at first, the far-channel IR detection is enabled, and an IR light beam at a first transmission power is emitted by the emitter for the distance detection. Next, when a proximity distance acquired through the far-channel IR detection reaches a switching threshold, the far-channel IR detection is switched to the near-channel IR detection, and, an IR light beam at a second transmission power smaller than the first transmission power, is emitted by the emitter for the distance detection. When the obstacle detected by the near-channel IR detection is too close to the screen, the screen of the mobile terminal is controlled to be in the OFF state.

However, in the conventional dual-IR distance detection system, it is necessary to trigger the switching to the near-channel IR detection in accordance with a distance detection result of the far-channel IR detection. When the far-channel IR detection is abnormal, it is impossible to switch the far-channel IR detection to the near-channel IR detection. Under this circumstance, it is impossible to control the screen to be in the OFF state when the obstacle is too close to the screen. The distance detection accuracy of the dual-IR distance detection system is relatively low and it is impossible to control an ON state and the OFF state of the screen accurately, so the user experience may be affected adversely.

SUMMARY

An object of the present disclosure is to provide a screen ON-and-OFF state control method, so as to solve the problem in the related art that it is impossible to accurately control ON and OFF states of a screen of a mobile terminal due to relatively low distance detection accuracy of an IR distance detection system.

In one aspect, the present disclosure provides in some embodiments a screen ON-and-OFF state control method, including: during the distance detection through the far-channel IR detection, when a timing start condition for the near-channel IR detection has been met, interrupting the far-channel IR detection, and enabling the near-channel IR detection for the distance detection; and controlling ON and OFF states of a screen of the mobile terminal in accordance with a distance detection result of the near-channel IR detection. Herein, a transmission power of an IR light beam corresponding to the far-channel IR detection is greater than a transmission power of an IR light beam corresponding to the near-channel IR detection.

In another aspect, the present disclosure provides in some embodiments a mobile terminal, including: a processing module configured to, during the distance detection through the far-channel IR detection, when a timing start condition for the near-channel IR detection has been met, interrupt the far-channel IR detection, and enable the near-channel IR detection for the distance detection; and a control module configured to control ON and OFF states of a screen of the mobile terminal in accordance with a distance detection result of the near-channel IR detection. Herein, the transmission power of an IR light beam corresponding to the far-channel IR detection is greater than the transmission power of an IR light beam corresponding to the near-channel IR detection.

In yet another aspect, the present disclosure provides in some embodiments a mobile terminal, including a processor, a memory, and a screen ON-and-OFF state control program stored in the memory and executed by the processor. The processor is configured to execute the screen ON-and-OFF state control program so as to implement the above-mentioned screen ON-and-OFF state control method.

In still yet another aspect, the present disclosure provides in some embodiments a computer-readable storage medium storing therein a screen ON-and-OFF state control program. The screen ON-and-OFF state control program is executed by a processor so as to implement the above-mentioned screen ON-and-OFF state control method.

According to the embodiments of the present disclosure, during the distance detection through the far-channel IR detection, when the timing start condition for the near-channel IR detection has been met, the far-channel IR detection may be interrupted, and the near-channel IR detection may be enabled for the distance detection. The transmission power of the IR light beam corresponding to the far-channel IR detection may be greater than the transmission power of the IR light beam corresponding to the near-channel IR detection. Then, the ON and OFF states of the screen of the mobile terminal may be controlled in accordance with the distance detection result of the near-channel IR detection. As a result, it is able to periodically switch the far-channel IR detection to the near-channel IR detection, improve the distance detection accuracy of the dual IR detection and accurately control the ON and OFF states of the screen of the mobile terminal, thereby to improve the user experience.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be comprehended as limiting the present disclosure. In these drawings.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The present disclosure will be described hereinafter in conjunction with the drawings and embodiments.

First Embodiment

Figure 1:
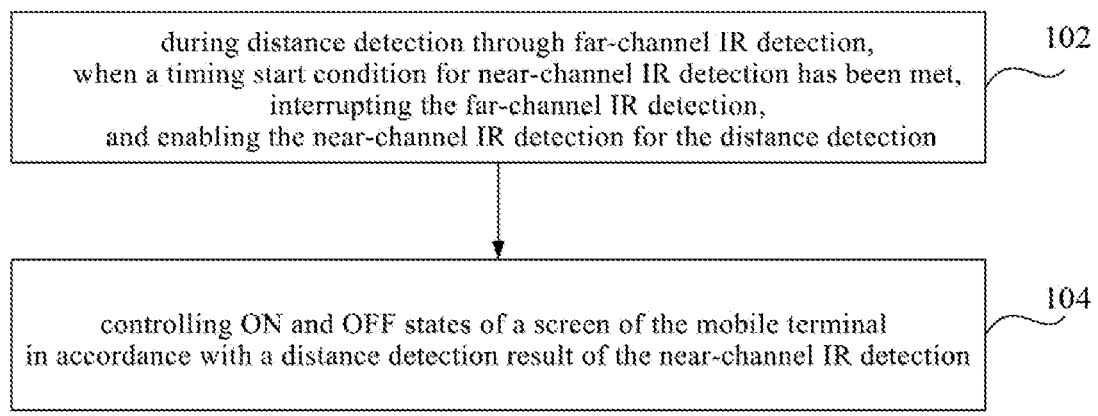
FIG. 1 is a flow chart of a screen ON-and-OFF state control method according to some embodiments of the present disclosure.

The present disclosure provides in this embodiment a screen ON-and-OFF state control method which, as shown in FIG. 1, includes the following steps.

Step 102: during a distance detection through a far-channel IR detection, when a timing start condition for near-channel IR detection has been met, interrupting the far-channel IR detection, and enabling the near-channel IR detection for the distance detection. A transmission power of an IR light beam corresponding to the far-channel IR detection may be greater than a transmission power of an IR light beam corresponding to the near-channel IR detection.

When a user is using a mobile terminal, the far-channel IR detection may be enabled by a dual IR distance detection system for the distance detection. During the distance detection through the far-channel IR detection, the far-channel IR detection may be interrupted periodically in accordance with the predetermined timing start condition of the near-channel IR detection, and the near-channel IR detection may be enabled for the distance detection, so as to determine whether there is an obstacle too close to a screen.

In the dual IR distance detection system, one emitter may be used by both the far-channel IR detection and the near-channel IR detection. During the far-channel IR detection, an IR light beam at a first transmission power may be emitted by the emitter, so as to perform the distance detection through the far-channel IR detection. When the timing start condition of the near-channel IR detection has been met, the transmission power of the IR light beam emitted by the emitter may be reduced from the first transmission power down to a second transmission power, so as to perform the distance detection through the near-channel IR detection. Herein, the first transmission power may be greater than the second transmission power.

It should be appreciated that, the first transmission power and the second transmission power may be determined according to the practical need, and thus will not be particularly defined herein.

In the embodiments of the present disclosure, the step of, during the distance detection through the far-channel IR detection, when the timing start condition for the near-channel IR detection has been met, interrupting the far-channel IR detection and enabling the near-channel IR detection for the distance detection may include: receiving a timing signal from a timer, the timing signal being transmitted by the timer at a predetermined frequency; upon the receipt of the timing signal, determining an ON/OFF state of the screen of the mobile terminal; and when the screen of the mobile terminal is in the ON state, interrupting the far-channel IR detection, and enabling the near-channel IR detection for the distance detection.

The timer may be preset in the dual IR distance detection system and configured to transmit the timing signal to the dual IR distance detection system at the predetermined frequency.

It should be appreciated that, the predetermined frequency may be set according to the practical need, and thus will not be particularly defined herein.

Upon the receipt of the timing signal, the dual IR distance detection system may determine the ON/OFF state of the screen of the mobile terminal.

When the screen of the mobile terminal is in the OFF state, it means that the obstacle close to the screen of the mobile terminal has been detected through the far-channel IR detection, and the screen of the mobile terminal has been controlled to be in the OFF state. At this time, the dual IR distance detection system may be still maintained to perform the distance detection through the far-channel IR detection and wait for a next timing signal from the timer.

When the screen of the mobile terminal is in the ON state, it means that no obstacle close to the screen of the mobile terminal has been detected through the far-channel IR detection, and at this time, the far-channel IR detection may be interrupted by the dual IR distance detection system, and the near-channel IR detection may be enabled for the distance detection.

Through reducing the transmission power of the emitter, it is able to switch the far-channel IR detection to the near-channel IR detection for the dual IR distance detection system.

Through the predetermined timing start condition of the near-channel IR detection, it is able to switch the far-channel IR detection to the near-channel IR detection independent of a distance detection result of the far-channel IR detection, thereby to perform the distance detection independently through the far-channel IR detection and the near-channel IR detection.

Step 104: controlling the ON and OFF states of the screen of the mobile terminal in accordance with a distance detection result of the near-channel IR detection.

To be specific, the controlling the ON and OFF states of the screen of the mobile terminal in accordance with the distance detection result of the near-channel IR detection may include: determining a first proximity distance acquired through the near-channel IR detection; when the first proximity distance is smaller than or equal to a predetermined screen-off threshold corresponding to the near-channel IR detection, controlling the screen of the mobile terminal to be in the OFF state; and when the first proximity distance is greater than the predetermined screen-off threshold corresponding to the near-channel IR detection, interrupting the near-channel IR detection and enabling the far-channel IR detection for the distance detection.

With respect to the near-channel IR detection, the predetermined screen-off threshold corresponding to the near-channel IR detection may be preset. During the distance detection through the near-channel IR detection, the ON and OFF states of the screen of the mobile terminal may be controlled in accordance with the predetermined screen-off threshold corresponding to the near-channel IR detection and the first proximity distance acquired through the near-channel IR detection.

When the first proximity distance is smaller than or equal to the predetermined screen-off threshold corresponding to the near-channel IR detection, it means that there is an obstacle close to the screen of the mobile terminal, and at this time, the screen of the mobile terminal may be controlled to be in the OFF state, so as to prevent the occurrence of the misoperation made by the obstacle on the screen of the mobile terminal.

When the first proximity distance is greater than the predetermined screen-off threshold corresponding to the near-channel IR detection, it means that there is no obstacle close to the screen of the mobile terminal. At this time, the dual IR distance detection system may interrupt the near-channel IR detection, enable the far-channel IR detection for the distance detection, and wait for a next timing signal from the timer.

Figure 2:
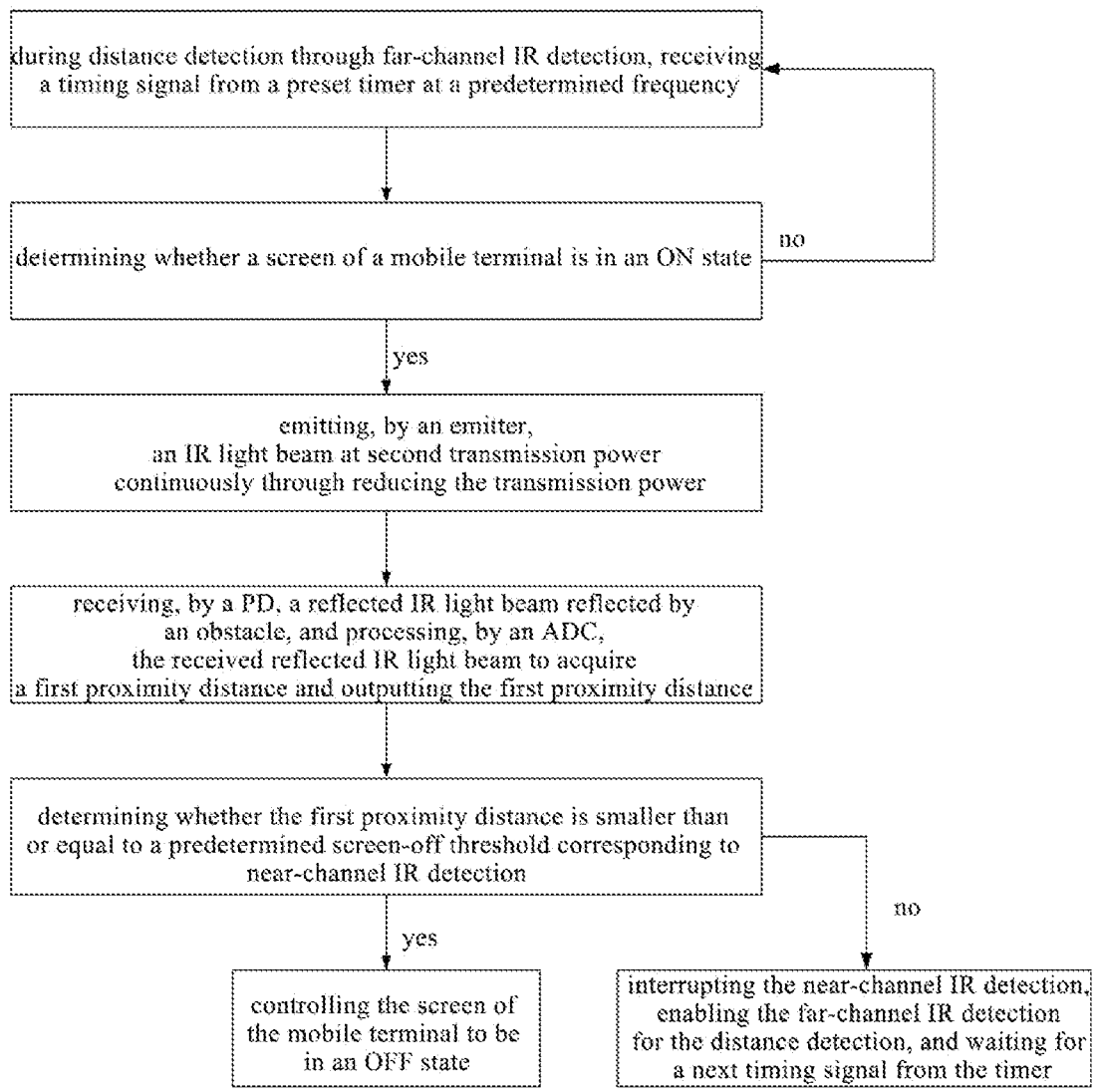
FIG. 2 is a flow chart of the near-channel IR detection according to some embodiments of the present disclosure.

FIG. 2 is a flow chart of the near-channel IR detection, which includes the following steps.

Step 202: during the distance detection through the far-channel IR detection, receiving the timing signal from the preset timer at the predetermined frequency. During the distance detection through the far-channel IR detection, the emitter may emit the IR light beam at the first transmission power continuously.

Step 204: determining whether the screen of the mobile terminal is in the ON state, if yes, proceeding to Step 206, and otherwise, returning to Step 202 and waiting for a next timing signal from the timer.

Step 206: emitting, by the emitter, the IR light beam at the second transmission power continuously through reducing the transmission power. Herein, the first transmission power may be greater than the second transmission power.

Step 208: receiving, by a photodiode (PD), a reflected IR light beam reflected by the obstacle, and processing the received reflected IR light beam to acquire the first proximity distance and outputting the first proximity distance by an analog-to-digital converter (ADC), i.e., the first proximity distance acquired through the near-channel IR detection.

Step 210: determining whether the first proximity distance is smaller than or equal to the predetermined screen-off threshold corresponding to the near-channel IR detection, if yes, proceeding to Step 212, and otherwise, proceeding to Step 214.

Step 212: when the obstacle is close to the screen of the mobile terminal, controlling the screen of the mobile terminal to be in the OFF state, so as to prevent the occurrence of the misoperation made by the obstacle on the screen of the mobile terminal.

Step 214: when there is no obstacle close to the screen of the mobile terminal, interrupting the near-channel IR detection by the dual IR distance detection system, enabling the far-channel IR detection for the distance detection, and waiting for a next timing signal from the timer.

During the continuous distance detection through the far-channel IR detection, the far-channel IR detection may be switched to the near-channel IR detection periodically in accordance with the timing start condition of the near-channel IR detection. Hence, in the case that one emitter is used by both the far-channel IR detection and the near-channel IR detection, it is able to perform the distance detection independently through the far-channel IR detection and the near-channel IR detection. Even when failure occurs for the far-channel IR detection, it is still able to perform the distance detection through the near-channel IR detection, thereby to improve the distance detection accuracy.

In the embodiments of the present disclosure, the method may further include: determining a second proximity distance acquired through the far-channel IR detection; and when the second proximity distance is smaller than or equal to a predetermined screen-off threshold corresponding to the far-channel IR detection, controlling the screen of the mobile terminal to be in the OFF state.

With respect to the far-channel IR detection, the predetermined screen-off threshold corresponding to the far-channel IR detection may be preset. During the distance detection through the far-channel IR detection, the ON and OFF states of the screen of the mobile terminal may be controlled in accordance with the predetermined screen-off threshold corresponding to the far-channel IR detection and the second proximity distance acquired through the far-channel IR detection.

Figure 3:
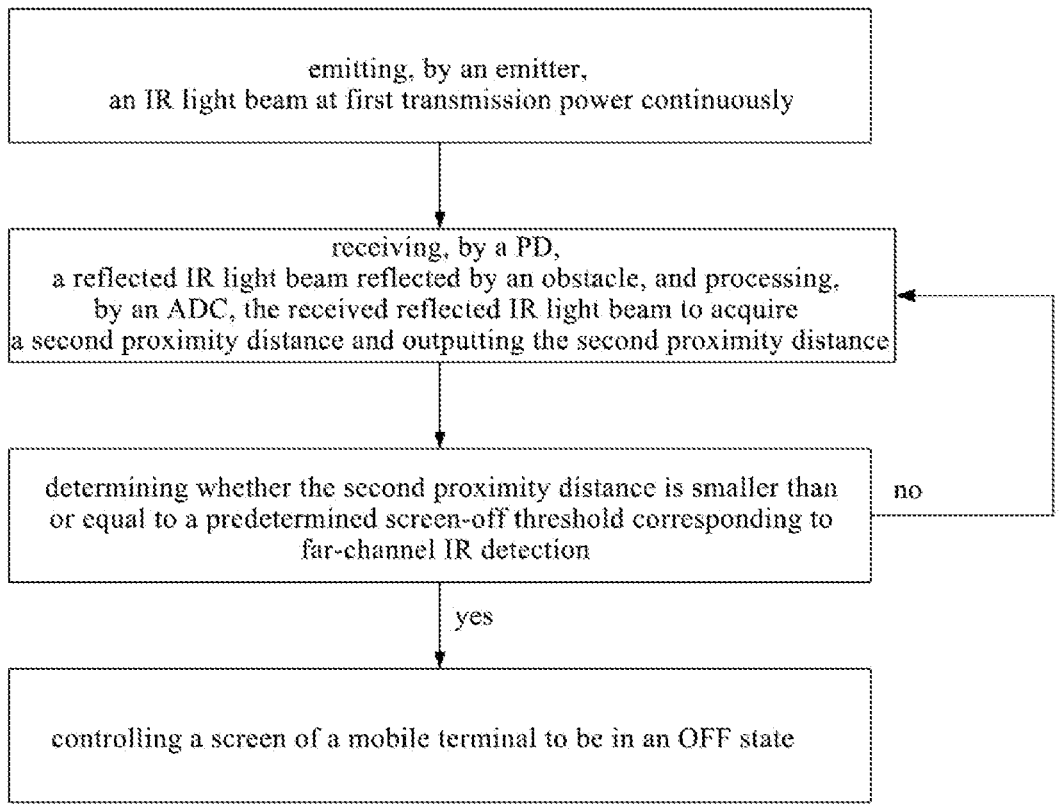
FIG. 3 is a flow chart of the far-channel IR detection according to some embodiments of the present disclosure.

FIG. 3 is a flow chart of the far-channel IR detection, which includes the following steps.

Step 302: emitting the IR light beam at the first transmission power continuously by the emitter.

Step 304: receiving, by the PD, a reflected IR light beam reflected by the obstacle, and processing the received reflected IR light beam to acquire the second proximity distance and outputting the second proximity distance by the ADC, i.e., the second proximity distance acquired through the far-channel IR detection.

Step 306: determining whether the second proximity distance is smaller than or equal to the predetermined screen-off threshold corresponding to the far-channel IR detection, if yes, proceeding to Step 308, and otherwise, returning to Step 304 and continuously monitoring the second proximity distance acquired through the far-channel IR detection.

Step 308: when the obstacle is close to the screen of the mobile terminal, controlling the screen of the mobile terminal to be in the OFF state, so as to prevent the occurrence of the misoperation made by the obstacle on the screen of the mobile terminal.

With respect to the far-channel IR detection, a predetermined screen-on threshold corresponding to the far-channel IR detection may be preset. During the distance detection through the far-channel IR detection, when the screen of the mobile terminal is in the OFF state, the ON and OFF states of the screen of the mobile terminal may be controlled in accordance with the predetermined screen-on threshold corresponding to the far-channel IR detection and the second proximity distance acquired through the far-channel IR detection.

When the second proximity distance is greater than or equal to the predetermined screen-on threshold corresponding to the far-channel IR detection, the screen of the mobile terminal may be controlled to be in the ON state, so as to prevent a normal operation made by a user on the mobile terminal from being adversely affected.

According to the embodiments of the present disclosure, during the distance detection through the far-channel IR detection, when the timing start condition for the near-channel IR detection has been met, the far-channel IR detection may be interrupted, and the near-channel IR detection may be enabled for the distance detection. The transmission power of the IR light beam corresponding to the far-channel IR detection may be greater than the transmission power of the IR light beam corresponding to the near-channel IR detection. Then, the ON and OFF states of the screen of the mobile terminal may be controlled in accordance with the distance detection result of the near-channel IR detection. As a result, it is able to periodically switch the far-channel IR detection to the near-channel IR detection, improve the distance detection accuracy of the dual IR detection and accurately control the ON and OFF states of the screen of the mobile terminal, thereby to improve the user experience.

Second Embodiment

Figure 4:
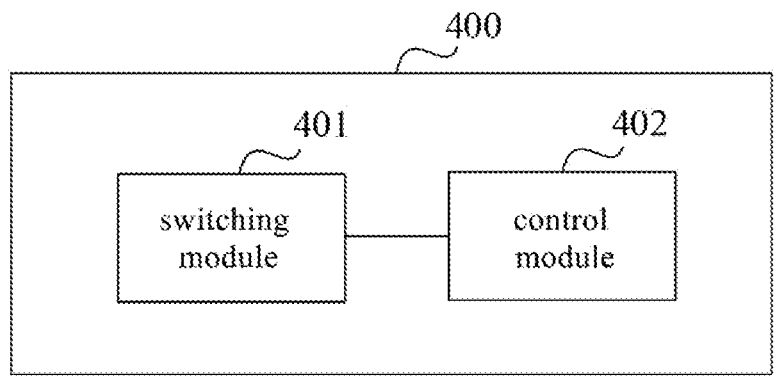
FIG. 4 is a schematic view showing a mobile terminal according to some embodiments of the present disclosure.

The present disclosure further provides in this embodiment a mobile terminal 400 which, as shown in FIG. 4, includes: a switching module 401 configured to, during distance detection through the far-channel IR detection, when a timing start condition for the near-channel IR detection has been met, interrupt the far-channel IR detection, and enable the near-channel IR detection for the distance detection; and a control module 402 configured to control ON and OFF states of a screen of the mobile terminal in accordance with a distance detection result of the near-channel IR detection. The transmission power of an IR light beam corresponding to the far-channel IR detection may be greater than transmission power of an IR light beam corresponding to the near-channel IR detection.

In a possible embodiment of the present disclosure, the switching module 402 may further include: a reception unit configured to receive a timing signal from a timer, the timing signal being transmitted by the timer at a predetermined frequency; a determination unit configured to, upon the receipt of the timing signal, determine an ON/OFF state of the screen of the mobile terminal; and a switching unit configured to, when the screen of the mobile terminal is in the ON state, interrupt the far-channel IR detection, and enable the near-channel IR detection for the distance detection.

In a possible embodiment of the present disclosure, the control module 403 may further include: a determination unit configured to determine a first proximity distance acquired through the near-channel IR detection; and a control unit configured to, when the first proximity distance is smaller than or equal to a predetermined screen-off threshold corresponding to the near-channel IR detection, control the screen of the mobile terminal to be in the OFF state.

In a possible embodiment of the present disclosure, the switching module 402 is further configured to, when the first proximity distance is greater than the predetermined screen-off threshold corresponding to the near-channel IR detection, interrupt the near-channel IR detection and enable the far-channel IR detection for the di stance detection.

In a possible embodiment of the present disclosure, the mobile terminal 400 may further include: a determination module 403 configured to determine a second proximity distance acquired through the far-channel IR detection, a control module 402 which is further configured to, when the second proximity distance is smaller than or equal to a predetermined screen-off threshold corresponding to the far-channel IR detection, control the screen of the mobile terminal to be in the OFF state.

The mobile terminal in this embodiment is capable of implementing the procedures for the mobile terminal in the first embodiment, and thus will not be particularly defined herein.

Figure 5:
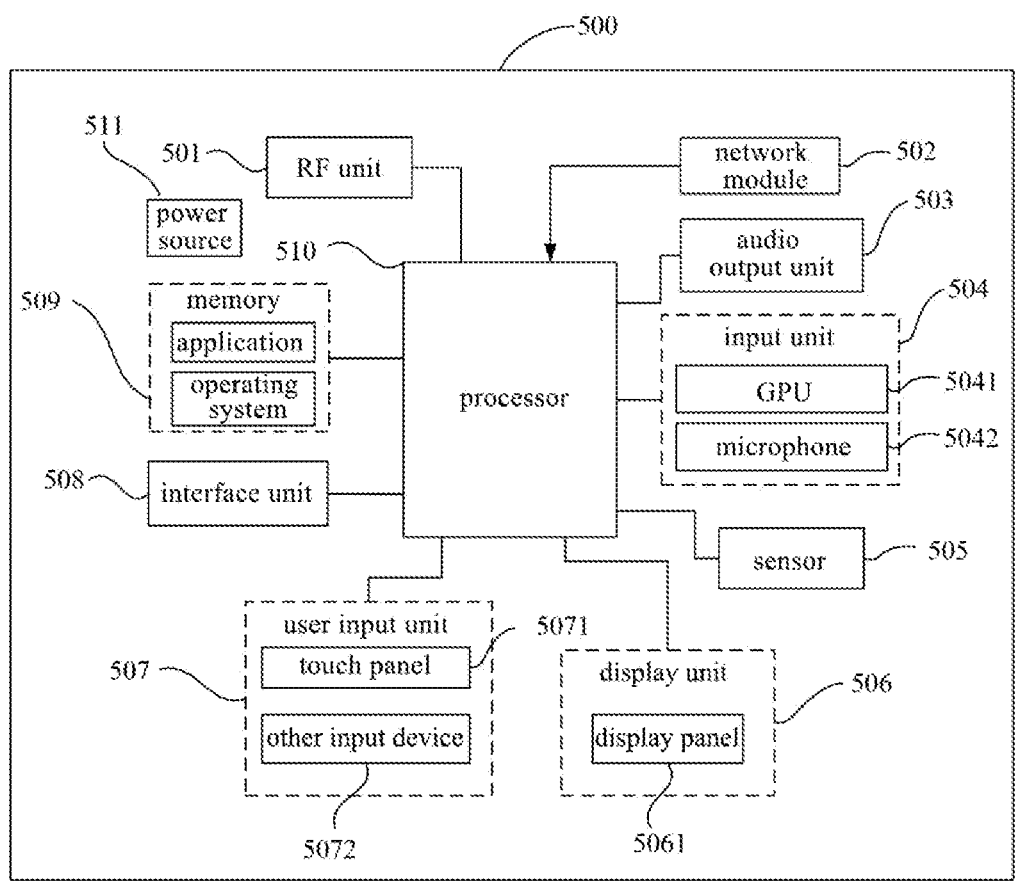
FIG. 5 is a schematic view showing a hardware structure of the mobile terminal according to some embodiments of the present disclosure.

FIG. 5 shows a hardware structure of a mobile terminal according to some embodiments of the present disclosure. The mobile terminal 500 may include, but not limited to, a Radio Frequency (RF) unit 501, a network module 502, an audio output unit 503, an input unit 504, a sensor 505, a display unit 506, a user input unit 507, an interface unit 508, a memory 509, a processor 510, and a power source 511. It should be appreciated that, the structure in FIG. 5 shall not be comprehended as limiting the mobile terminal. The mobile terminal may include more or fewer members, or some members may be combined, or the mobile terminal may include some other members not shown in FIG. 5. In the embodiments of the present disclosure, the mobile terminal may include, but not limited to, mobile phone, flat-panel computer, laptop computer, Personal Digital Assistant (PDA), vehicle-mounted terminal, wearable device or pedometer.

The processor 501 is configured to: during distance detection through the far-channel IR detection, when a timing start condition for the near-channel IR detection has been met, interrupt the far-channel IR detection, and enable the near-channel IR detection for the distance detection; and control ON and OFF states of a screen of the mobile terminal in accordance with a distance detection result of the near-channel IR detection. The transmission power of an IR light beam corresponding to the far-channel IR detection may be greater than transmission power of an IR light beam corresponding to the near-channel IR detection.

During the distance detection through the far-channel IR detection, when the timing start condition for the near-channel IR detection has been met, the far-channel IR detection may be interrupted, and the near-channel IR detection may be enabled for the distance detection. The transmission power of the IR light beam corresponding to the far-channel IR detection may be greater than the transmission power of the IR light beam corresponding to the near-channel IR detection. Then, the ON and OFF states of the screen of the mobile terminal may be controlled in accordance with the distance detection result of the near-channel IR detection. As a result, it is able to periodically switch the far-channel IR detection to the near-channel IR detection, improve the distance detection accuracy of the dual IR detection and accurately control the ON and OFF states of the screen of the mobile terminal, thereby to improve the user experience.

It should be appreciated that, in the embodiments of the present disclosure, the RF unit 501 is configured to transmit and receive signals during the information transmission or phone call. To be specific, the RF unit 501 may, upon the receipt of downlink data from a base station, transmit the downlink data to the processor 510 for subsequent treatment. In addition, the RF unit 501 may transmit uplink data to the base station. Usually, the RF unit 501 may include, but not limited to, an antenna, at least one amplifier, a transceiver, a coupler, a low-noise amplifier and a duplexer. In addition, the RF unit 501 may communicate with a network and the other devices via a wireless communication system.

The network module 502 is configured to enable the mobile terminal to access the broadband Internet in a wireless manner, e.g., help a user to receive and send an e-mail, browse a web page or access a streaming media.

The audio output unit 503 is configured to convert audio data received by the RF unit 501 or the network module 502, or audio data stored in the memory 509, into an audio signal and output the audio signal as a sound. In addition, the audio output unit 503 is further configured to provide an audio output related to a specific function executed by the mobile terminal 500 (e.g., a sound occurring when a calling signal or a message has been received). The audio output unit 503 may include a loudspeaker, a buzzer and a receiver.

The input unit 504 is configured to receive an audio or video signal. It may include a Graphics Processing Unit (GPU) 5041 and a microphone 5042. The GPU 5041 is configured to process image data of a static image or video acquired by an image collection unit (e.g., a camera) in a video capturing mode or an image capturing mode, and a processed image frame may be displayed by the display unit 506. The image frame processed by the GPU 5041 may be stored in the memory 509 (or any other storage medium) or transmitted via the RF unit 501 or network module 502. The microphone 5042 is configured to receive a sound, and convert the sound into voice data. In a call mode, the processed audio data may be converted into data in a format capable of being transmitted by the RF unit 501 to a mobile communication base station.

The mobile terminal 500 contains at least one sensor 505, which may include a light sensor, a movement sensor and the other sensors. To be specific, the light sensor may include an ambient light sensor or a proximity sensor. The ambient light sensor is configured to adjust a brightness value of a display panel 5061 in accordance with ambient light. The proximity sensor is configured to turn off the display panel 5061 and/or a backlight source when the mobile terminal 500 moves close to an ear. As one of the movement sensors, an accelerometer may detect acceleration in various directions (usually a three-axis accelerometer), and detect a level and a direction of a gravity force in a static state. Through the accelerometer, it is able to identify a posture of the mobile terminal (e.g., perform a switching operation between portrait and landscape orientations, play relevant games, and calibrate a posture of a magnetometer), and perform vibration-related functions (e.g., count steps and strikes). The sensor 505 may further include a fingerprint sensor, a pressure sensor, an iris sensor, a molecule sensor, a gyroscope, a barometer, a hygrometer, a thermometer or an infrared sensor, which will not be particularly defined herein.

The display unit 506 is configured to display information inputted by the user or provided to the user. The display unit 506 may include the display panel 5061, e.g., a Liquid Crystal Display (LCD) panel, or an Organic Light-Emitting Diode (OLED) panel.

The user input unit 507 is configured to receive digital or character information inputted by the user, and generate a key signal input related to user settings and function control of the mobile terminal. To be specific, the user input unit 507 may include a touch panel 5071 and another input device 5072. The touch panel 5071, also called as touch screen, is configured to collect a touch operation made by the user on or in proximity to the touch panel (e.g., an operation made by the user through any appropriate object or attachment (e.g., finger or stylus) on or in the proximity to the touch panel 5071). The touch panel 5071 may include a touch detection unit and a touch controller. The touch detection unit is configured to detect a touch position and a signal generated due to the touch operation, and to transmit the signal to the touch controller. The touch controller is configured to receive touch information from the touch detection unit, convert it into coordinates of a touch point, transmit the coordinates to the processor 510, and receive and execute a command from the processor 510. In addition, the touch panel 5071 may be of a resistive type, a capacitive type, an infrared type or a surface acoustic wave (SAW) type. The other input device 5072 may include, but not limited to, a physical keyboard, a functional button (e.g., a volume control button or an on/off button), a trackball, a mouse, and a joystick, which will not be particularly defined herein.

Further, the touch panel 5071 may cover the display panel 5061. When the touch operation made on or in proximity to the touch panel 5071 has been detected, the touch panel 5071 may transmit the touch information to the processor 510, so as to determine a type of a touch event. Then, the processor 510 may control the display panel 5061 to provide a corresponding visual output in accordance with the type of the touch event. Although the touch panel 5071 and the display panel 5061 are configured as two separate members in FIG. 5, in some embodiments of the present disclosure, they may be integrated so as to achieve the input and output functions of the electronic device, which will not be particularly defined herein.

The interface unit 508 is configured to provide an interface between an external device and the mobile terminal 500. For example, the external device may include a wired or wireless headset port, an external power source port (or a charging port), a wired or wireless data port, a memory card port, a port for a device having an identification module, an audio input/output (I/O) port, a video I/O port, and an earphone port. The interface unit 508 is configured to receive an input from the external device (e.g., data information and electricity) and transmit the input to one or more elements of the mobile terminal 500, or transmit data between the mobile terminal 500 and the external device.

The memory 509 is configured to store therein a software application and various data. It may mainly include an application storage area and a data storage area. An operating system and at least one application for the functions (e.g., an audio/image playing function) may be stored in the application storage area. Data created in accordance with the operation of the mobile phone (e.g., audio data and textbook) may be stored in the data storage area. In addition, the memory 509 may include a high-speed random access memory (RAM), or a non-volatile memory (e.g., at least one magnetic disk or flash memory), or any other volatile solid state memory.

As a control center of the electronic device, the processor 510 may be connected to the other members of the electronic device via various interfaces and circuits, and configured to run or execute the software program and/or module stored in the memory 509, and call the data stored in the memory 509, so as to execute the functions of the electronic device and process the data, thereby to monitor the entire electronic device. The processor 510 may include one or more processing units. In a possible embodiment of the present disclosure, an application processor and a modem may be integrated into the processor 510. The application processor is mainly configured to process the operating system, a user interface and the application. The modem is mainly configured to process wireless communication. It should be appreciated that, the modem may also not be integrated into the processor 510.

The power source 511 (e.g., a battery) is configured to supply power to the members of the mobile terminal 500. In a possible embodiment of the present disclosure, the power source 511 is logically connected to the processor 510 via a power source management system, so as to achieve such functions as charging, discharging and power consumption management through the power source management system.

In addition, the mobile terminal 500 may include some functional modules not shown in FIG. 5, which will not be particularly defined herein.

The present disclosure further provides in some embodiments a mobile terminal, which includes a processor 510, a memory 509, and a screen ON-and-OFF state control program stored in the memory 509 and executed by the processor 510. The processor 510 is configured to execute the screen ON-and-OFF state control program so as to implement the above-mentioned screen ON-and-OFF state control method with a same technical effect, which will not be particularly defined herein.

The present disclosure further provides in some embodiments a computer-readable storage medium storing therein a screen ON-and-OFF state control program. The screen ON-and-OFF state control program is executed by a processor so as to implement the above-mentioned screen ON-and-OFF state control method with a same technical effect, which will not be particularly defined herein. The computer-readable storage medium may be a ROM, an RAM, a magnetic disk or an optical disk.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A screen ON-and-OFF state control method realized by a mobile terminal, wherein the mobile terminal comprises a processor and a memory, the screen ON-and-OFF state control method comprising:

during a distance detection through a far-channel Infrared (IR) detection, when a timing start condition for a near-channel IR detection has been met, interrupting, by the processor, the far-channel IR detection, and enabling the near-channel IR detection for the distance detection; and controlling, by the processor, ON and OFF states of a screen of the mobile terminal in accordance with a distance detection result of the near-channel IR detection, wherein a transmission power of an IR light beam corresponding to the far-channel IR detection is greater than a transmission power of an IR light beam corresponding to the near-channel IR detection, wherein during the distance detection through the far-channel IR detection, when the timing start condition for the near-channel IR detection has been met, the interrupting, by the processor, the far-channel IR detection and enabling the near-channel IR detection for the distance detection comprises:

receiving, by the processor, a timing signal from a timer, the timing signal being transmitted by the timer at a predetermined frequency;

upon the receipt of the timing signal, determining, by the processor, the ON state or the OFF state of the screen of the mobile terminal; and when the screen of the mobile terminal is in the ON state, interrupting, by the processor, the far-channel IR detection, and enabling the near-channel IR detection for the distance detection.

2. The screen ON-and-OFF state control method according to claim 1, wherein the controlling, by the processor, the ON and OFF states of the screen of the mobile terminal in accordance with the distance detection result of the near-channel IR detection comprises:

determining, by the processor, a first proximity distance acquired through the near-channel IR detection; and when the first proximity distance is smaller than or equal to a predetermined screen-off threshold corresponding to the near-channel IR detection, controlling, by the processor, the screen of the mobile terminal to be in the OFF state.

3. The screen ON-and-OFF state control method according to claim 2, further comprising:

when the first proximity distance is greater than the predetermined screen-off threshold corresponding to the near-channel IR detection, interrupting, by the processor, the near-channel IR detection and enabling the far-channel IR detection for the distance detection.

4. The screen ON-and-OFF state control method according to claim 3, further comprising:

determining, by the processor, a second proximity distance acquired through the far-channel IR detection; and when the second proximity distance is smaller than or equal to a predetermined screen-off threshold corresponding to the far-channel IR detection, controlling, by the processor, the screen of the mobile terminal to be in the OFF state.

5. The screen ON-and-OFF state control method according to claim 1, wherein one common IR emitter is used by the far-channel IR detection and the near-channel IR detection.

6. The screen ON-and-OFF state control method according to claim 1, wherein one common proximity sensor is used by the far-channel IR detection and the near-channel IR detection.

7. A mobile terminal, comprising a processor, a memory, and a screen ON-and-OFF state control program stored in the memory and executed by the processor, wherein the processor is configured to execute the screen ON-and-OFF state control program so as to implement a screen ON-and-OFF state control method, the screen ON-and-OFF state control method comprising:

during a distance detection through a far-channel Infrared (IR) detection, when a timing start condition for a near-channel IR detection has been met, interrupting, by the processor, the far-channel IR detection, and enabling the near-channel IR detection for the distance detection; and controlling, by the processor, ON and OFF states of a screen of the mobile terminal in accordance with a distance detection result of the near-channel IR detection, wherein a transmission power of an IR light beam corresponding to the far-channel IR detection is greater than a transmission power of an IR light beam corresponding to the near-channel IR detection, wherein during the distance detection through the far-channel IR detection, when the timing start condition for the near-channel IR detection has been met, the interrupting, by the processor, the far-channel IR detection and enabling the near-channel IR detection for the distance detection comprises:

receiving, by the processor, a timing signal from a timer, the timing signal being transmitted by the timer at a predetermined frequency;

upon the receipt of the timing signal, determining, by the processor, the ON state or the OFF state of the screen of the mobile terminal; and when the screen of the mobile terminal is in the ON state, interrupting, by the processor, the far-channel IR detection, and enabling the near-channel IR detection for the distance detection.

8. The mobile terminal according to claim 7, wherein the controlling, by the processor, the ON and OFF states of the screen of the mobile terminal in accordance with the distance detection result of the near-channel IR detection comprises:

determining, by the processor, a first proximity distance acquired through the near-channel IR detection; and when the first proximity distance is smaller than or equal to a predetermined screen-off threshold corresponding to the near-channel IR detection, controlling, by the processor, the screen of the mobile terminal to be in the OFF state.

9. The mobile terminal according to claim 8, wherein when the first proximity distance is greater than the predetermined screen-off threshold corresponding to the near-channel IR detection, the mobile terminal is configured to interrupt the near-channel IR detection and enable the far-channel IR detection for the distance detection.

10. The mobile terminal according to claim 9, wherein the mobile terminal is configured to determine a second proximity distance acquired through the far-channel IR detection; and when the second proximity distance is smaller than or equal to a predetermined screen-off threshold corresponding to the far-channel IR detection, the mobile terminal is configured to control the screen of the mobile terminal to be in the OFF state.

11. The mobile terminal according to claim 7, wherein one common IR emitter is used by the far-channel IR detection and the near-channel IR detection.

12. The mobile terminal according to claim 7, wherein one common proximity sensor is used by the far-channel IR detection and the near-channel IR detection.

13. A non-transitory computer-readable storage medium storing therein a screen ON-and-OFF state control program, wherein the screen ON-and-OFF state control program is executed by a processor so as to implement a screen ON-and-OFF state control method realized by a mobile terminal, the screen ON-and-OFF state control method comprising:

during a distance detection through a far-channel Infrared (IR) detection, when a timing start condition for a near-channel IR detection has been met, interrupting, by the processor, the far-channel IR detection, and enabling the near-channel IR detection for the distance detection; and controlling, by the processor, ON and OFF states of a screen of the mobile terminal in accordance with a distance detection result of the near-channel IR detection, wherein a transmission power of an IR light beam corresponding to the far-channel IR detection is greater than a transmission power of an IR light beam corresponding to the near-channel IR detection, wherein during the distance detection through the far-channel IR detection, when the timing start condition for the near-channel IR detection has been met, the interrupting, by the processor, the far-channel IR detection and enabling the near-channel IR detection for the distance detection comprises:

receiving, by the processor, a timing signal from a timer, the timing signal being transmitted by the timer at a predetermined frequency;

upon the receipt of the timing signal, determining, by the processor, the ON state or the OFF state of the screen of the mobile terminal; and when the screen of the mobile terminal is in the ON state, interrupting, by the processor, the far-channel IR detection, and enabling the near-channel IR detection for the distance detection.

14. The non-transitory computer-readable storage medium according to claim 13, wherein the controlling, by the processor, the ON and OFF states of the screen of the mobile terminal in accordance with the distance detection result of the near-channel IR detection comprises:

determining, by the processor, a first proximity distance acquired through the near-channel IR detection; and when the first proximity distance is smaller than or equal to a predetermined screen-off threshold corresponding to the near-channel IR detection, controlling, by the processor, the screen of the mobile terminal to be in the OFF state.

15. The non-transitory computer-readable storage medium according to claim 14, wherein when the first proximity distance is greater than the predetermined screen-off threshold corresponding to the near-channel IR detection, the processor is configured to interrupt the near-channel IR detection and enable the far-channel IR detection for the distance detection.

16. The non-transitory computer-readable storage medium according to claim 15, wherein the processor is configured to determine a second proximity distance acquired through the far-channel IR detection; and when the second proximity distance is smaller than or equal to a predetermined screen-off threshold corresponding to the far-channel IR detection, the processor is configured to control the screen of the mobile terminal to be in the OFF state.

17. The non-transitory computer-readable storage medium according to claim 13, wherein one common IR emitter is used by the far-channel IR detection and the near-channel IR detection; or
 wherein one common proximity sensor is used by the far-channel IR detection and the near-channel IR detection.

* * * * *